United States Patent
Keshavan et al.

(10) Patent No.: US 11,655,720 B2
(45) Date of Patent: May 23, 2023

(54) METHODS AND MATERIALS FOR REPAIRING A THERMAL BARRIER COATING OF A GAS TURBINE COMPONENT

(71) Applicant: General Electric Company, Schenectady, NY (US)

(72) Inventors: Hrishikesh Keshavan, Watervliet, NY (US); Atanu Saha, Bangaluru (IN); Margeaux Wallace, Niskayuna, NY (US); Mamatha Nagesh, Bangaluru (IN); Ambarish Jayant Kulkarni, Glenville, NY (US); Bernard Patrick Bewlay, Jr., Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/313,538

(22) Filed: May 6, 2021

(65) Prior Publication Data
US 2021/0396181 A1 Dec. 23, 2021

(30) Foreign Application Priority Data
Jun. 19, 2020 (IN) .............................. 202011025995

(51) Int. Cl.
*F01D 5/28* (2006.01)
*F01D 5/00* (2006.01)
(Continued)

(52) U.S. Cl.
CPC ............. *F01D 5/288* (2013.01); *B05D 5/005* (2013.01); *B05D 7/24* (2013.01); *F01D 5/005* (2013.01);
(Continued)

(58) Field of Classification Search
CPC ................ F01D 5/288; F05D 2230/90; F05D 2300/611; B05D 5/005; B05D 7/24; F02C 7/24
See application file for complete search history.

(56) References Cited

U.S. PATENT DOCUMENTS 5,972,424 A 10/1999 Draghi et al.
6,168,833 B1 1/2001 Leushake et al.
(Continued)

FOREIGN PATENT DOCUMENTS

CN 104126028 10/2014
CN 109641809 4/2019
(Continued)

OTHER PUBLICATIONS

Almatis. −325 Mesh Ground Calcined Aluminas. Retrieved from https://www.almatis.com/media/vp1p4c54/rp-am-rcp-003_-325-ground-calcined-aluminas_1017.pdf on Jun. 21, 2022 (Year: 2022).*
(Continued)

*Primary Examiner* — Topaz L. Elliott
(74) *Attorney, Agent, or Firm* — Fitch, Even, Tabin & Flannery LLP (57) ABSTRACT

A sprayable thermal barrier coating powder mixture for a gas turbine engine includes: a dry composition having a low surface area ceramic powder having a median particle size distribution greater than 5 microns and less than 50 microns, and a high surface area ceramic powder having a median particle size distribution smaller than 5 microns, wherein the low surface area ceramic powder makes up at least 50% by weight of the dry composition of the sprayable thermal barrier coating powder mixture.

19 Claims, 5 Drawing Sheets

(51) Int. Cl.
*B05D 5/00* (2006.01)
*B05D 7/24* (2006.01)

(52) U.S. Cl.
CPC ...... *F05D 2220/32* (2013.01); *F05D 2230/31* (2013.01); *F05D 2230/80* (2013.01); *F05D 2230/90* (2013.01); *F05D 2240/35* (2013.01); *F05D 2260/231* (2013.01); *F05D 2300/611* (2013.01); *F05D 2300/701* (2013.01)

(56) References Cited

U.S. PATENT DOCUMENTS

| | | | |
|---|---|---|---|
| 6,294,260 | B1 | 9/2001 | Subramanian |
| 6,413,578 | B1 | 7/2002 | Stowell |
| 6,465,090 | B1 * | 10/2002 | Stowell ............... C04B 41/52 428/323 |
| 6,641,907 | B1 | 11/2003 | Merrill et al. |
| 6,827,969 | B1 | 12/2004 | Skoog et al. |
| 8,017,230 | B2 | 9/2011 | Taylor |
| 8,221,825 | B2 | 7/2012 | Reitz et al. |
| 9,096,763 | B2 * | 8/2015 | Belov ............... E04B 1/78 |
| 10,265,726 | B2 | 4/2019 | Dubanchet et al. |
| 10,822,687 | B2 * | 11/2020 | Saha ............... C23C 12/00 |
| 2004/0214938 | A1 | 10/2004 | Rudd et al. |
| 2005/0228098 | A1 | 10/2005 | Skoog et al. |
| 2008/0011441 | A1 | 1/2008 | Oswald et al. |
| 2009/0162674 | A1 * | 6/2009 | Boutwell ............... C04B 41/009 428/447 |
| 2010/0242477 | A1 | 9/2010 | Duval |
| 2013/0156958 | A1 * | 6/2013 | Belov ............... C09D 5/00 427/372.2 |
| 2017/0101539 | A1 * | 4/2017 | Pan ............... B05D 3/002 |
| 2017/0122561 | A1 | 5/2017 | Nagaraj |
| 2017/0247787 | A1 * | 8/2017 | Saha ............... C04B 41/009 |
| 2018/0050964 | A1 | 2/2018 | McEvoy et al. |
| 2018/0154381 | A1 | 6/2018 | Bewlay et al. |
| 2019/0095765 | A1 | 3/2019 | Lim et al. |
| 2019/0143350 | A1 | 5/2019 | Kulkarni et al. |
| 2019/0143358 | A1 | 5/2019 | Kulkarni et al. |
| 2019/0178093 | A1 | 6/2019 | Bullinger et al. |
| 2019/0316246 | A1 | 10/2019 | Keshavan et al. |
| 2021/0171409 | A1 * | 6/2021 | Ucasz ............... C04B 41/5096 |

FOREIGN PATENT DOCUMENTS

| | | | |
|---|---|---|---|
| CN | 109663730 | A * | 4/2019 |
| CN | 110387147 | | 10/2019 |

OTHER PUBLICATIONS

Baikowski. SM8 Baikalox High Purity Alumina Powder. Retrieved from https://www.baikowski.com/en/serie/sm/ on Jun. 21, 2022. (Year: 2022).*
Fisher Chemical. Reagent Alcohol. Retrieved from https://www.fishersci.com/shop/products/alcohol-reagent-histological-fisher-chemical-5/A9624 on Jun. 21, 2022 (Year: 2022).*
Evonik Operations GBMH. Aeroxide Alu C. Retrieved from https://products-re.evonik.com/www2/uploads/productfinder/AEROXIDE-Alu-C-EN.pdf on Jun. 21, 2022. (Year: 2021).*
Sartomer. Product Bulletin: SR-350. Retrieved from http://www.inforubber.com/product/coagent/sr350.pdf on Jun. 21, 2022. (Year: 2022).*
Nippon Light Metal Company. Regular/Coarse Grain Alumina. retreived from https://www.nikkeikin.com/products/chemical/alumina/Regular&Coarse%20Grain%20Alumina.pdf on Jun. 21, 2022 (Year: 2022).*
Lubrizol. The Role of Dispersants in Advanced Ceramics. Accessed from https://www.lubrizol.com/Coatings/Blog/2019/08/Role-of-Dispersants-in-Ceramics (Year: 2022).*
Tozzi. Binders for Ceramic Bodies. Accessed from https://digitalfire.com/article/binders+for+ceramic+bodies (Year: 2022).*
Waldbillig et al., "Effect of suspension plasma spraying process parameters on YSZ coating microstructure and permeability," Surface & Coatings Technology, 2001, vol. 205, pp. 5483-5492.

* cited by examiner

METHODS AND MATERIALS FOR REPAIRING A THERMAL BARRIER COATING OF A GAS TURBINE COMPONENT

PRIORITY INFORMATION

The present application claims priority to Indian Patent Application Number 202011025995 filed Jun. 19, 2020.

FIELD

The present subject matter relates generally to methods and materials for repairing a thermal barrier coating of a component of an engine, and in particular a powder mixture and method of applying such powder mixture in situ.

BACKGROUND

The use of thermal barrier coatings (TBCs) on components such as combustors, high pressure turbine (HPT) blades, vanes and shrouds helps such components to survive higher operating temperatures, increases component durability, and improves engine reliability. TBCs are typically formed of a ceramic material and deposited on an environmentally-protective bond coat to form what is termed a TBC system.

Under service conditions, hot section engine components protected by a TBC system can be susceptible to various modes of damage, including erosion, oxidation and corrosion from exposure to the gaseous products of combustion, foreign object damage (FOD), and attack from environmental contaminants. The source of environmental contaminants is ambient air, which is drawn in by the engine for cooling and combustion. The type of environmental contaminants in ambient air will vary from location to location, but can be of a concern to an aircraft as their purpose is to move from location to location. These environmental contaminants are in addition to the corrosive and oxidative contaminants that result from the combustion of fuel. However, all of these contaminants can adhere to the surfaces of the hot section components, including those that are protected with a TBC system.

Some of these contaminants may result in TBC loss over the life of the components, leaving a thin portion of the TBC, or completely removing a portion of the TBC leaving the underlying component exposed to the operational conditions and potentially damaging such component. In the event such damage occurs, it generally will need to be repaired. A system and/or method for repairing such a TBC would be useful.

BRIEF DESCRIPTION

Aspects and advantages of the invention will be set forth in part in the following description, or may be obvious from the description, or may be learned through practice of the invention.

An aspect of the present disclosure is directed to a sprayable thermal barrier coating powder mixture for a gas turbine engine. The sprayable thermal barrier coating powder mixture includes: a dry composition having a low surface area ceramic powder having a median particle size distribution greater than 5 microns and less than 50 microns, and a high surface area ceramic powder having a median particle size distribution smaller than 5 microns, wherein the low surface area ceramic powder makes up at least 50% by weight of the dry composition of the sprayable thermal barrier coating powder mixture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As will be appreciated, a thermal barrier coating ("TBC") may be damaged or deteriorated throughout its life by, e.g., contaminants, leaving a thin portion of the TBC, or completely removing a portion of the TBC leaving the underlying component exposed to the operational conditions and potentially damaging such component. In order to repair these areas of the TBC, it is generally necessary to take the engine "off wing" (i.e., uninstall the engine from the aircraft), remove the component (or disassemble the engine to an extent that the component is exposed), clean the area to be repaired, apply a TBC patch, cure the TBC patch, and reassemble and reinstall the engine. Such is a fairly time consuming and costly process.

Accordingly, it will be appreciated that it would be desirable if systems and methods were available for repairing a TBC without requiring the engine to be taken off wing and at least partially disassembled. In one aspect of the present disclosure, a sprayable thermal barrier coating powder mixture for a gas turbine engine is provided that may be applied in situ, without requiring the component and newly applied thermal barrier coating powder mixture to be separately cured outside of the engine. In certain aspects, the sprayable thermal barrier coating powder mixture may include: a dry composition having a low surface area ceramic powder having a median particle size distribution greater than 5 microns and less than 50 microns, and a high surface area ceramic powder having a median particle size distribution smaller than 5 microns, wherein the low surface area ceramic powder makes up at least 50% by weight of the dry composition of the sprayable thermal barrier coating powder mixture.

For example, in certain exemplary aspects such a configuration may allow the mixture to define an activation temperature range from around 300 degrees Celsius to around 1200 degrees Celsius, such that the thermal barrier coating mixture may be cured by way of operation of the gas turbine engine. Such may allow for a quicker and less expensive repair process, as the thermal barrier coating powder mixture may be applied and cured without taking the engine off wing.

Figure 1:
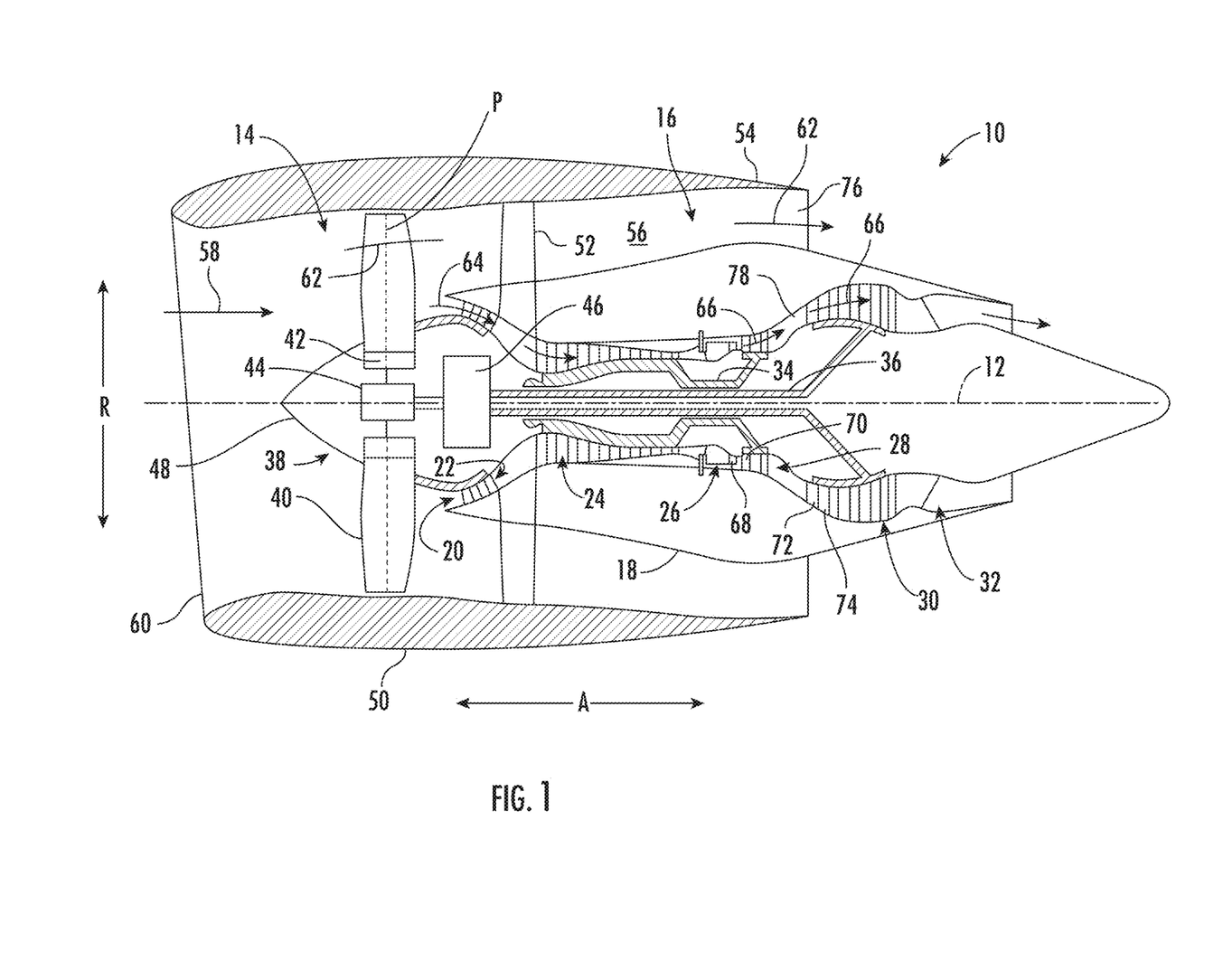
FIG. 1 is a schematic cross-sectional view of an exemplary gas turbine engine according to various embodiments of the present subject matter.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP)

compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
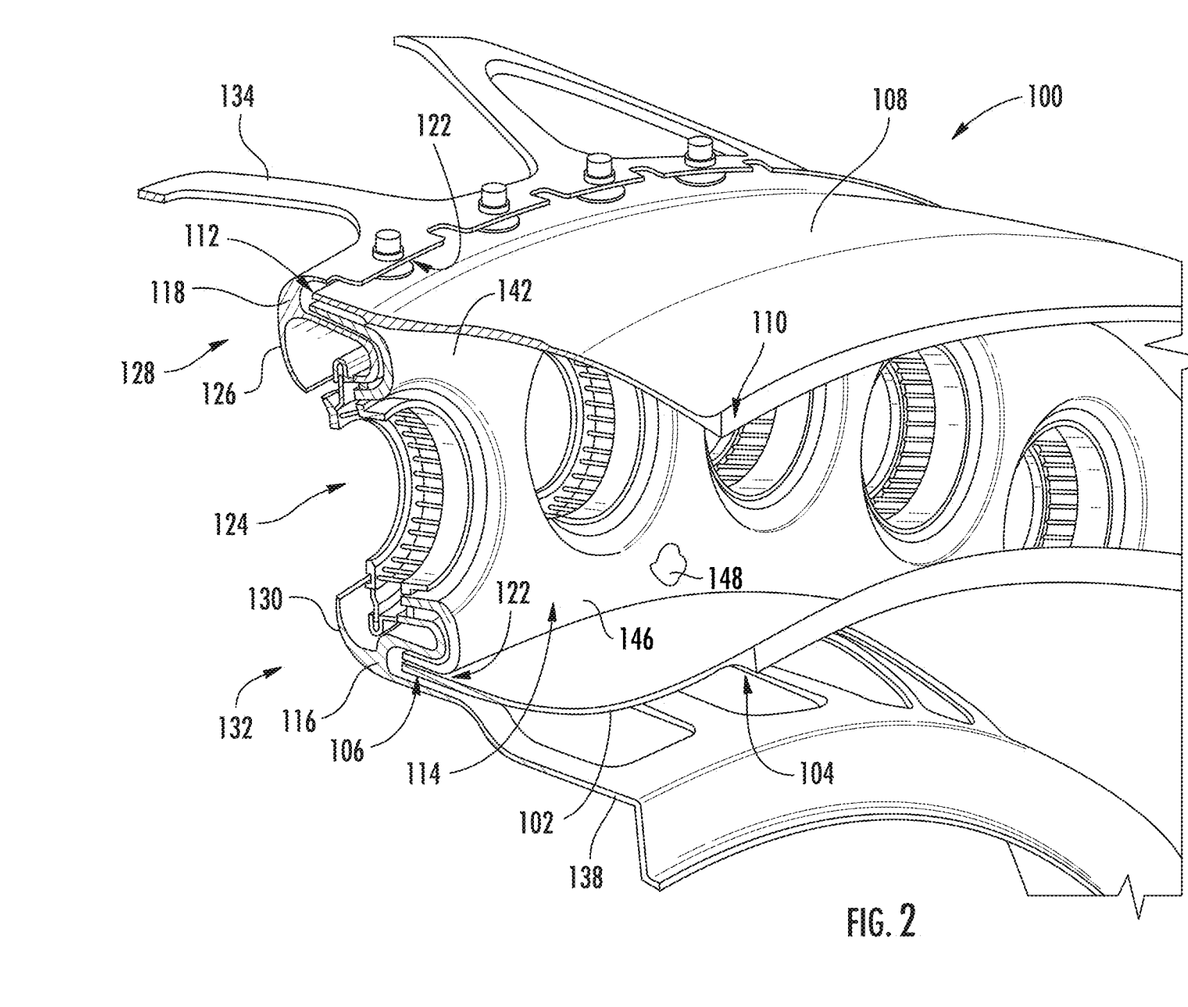
FIG. 2 is a perspective, cross-sectional view of a combustor assembly in accordance with an exemplary embodiment of the present disclosure having a damaged TBC.

Referring now to FIG. 2, a close-up cross-sectional view is provided of the combustion section 26 of the exemplary turbofan engine 10 of FIG. 1. More particularly, FIG. 2 provides a perspective, cross-sectional view of a combustor assembly 100, which may be positioned in the combustion section 26 of the exemplary turbofan engine 10 of FIG. 1, in accordance with an exemplary embodiment of the present disclosure.

As shown, the combustor assembly 100 generally includes an inner liner 102 extending between an aft end 104 and a forward end 106 generally along the axial direction A, as well as an outer liner 108 also extending between and aft end 110 and a forward end 112 generally along the axial direction A. The inner and outer liners 102, 108 together at least partially define a combustion chamber 114 therebetween. The inner and outer liners 102, 108 are each attached to an annular dome. More particularly, the combustor assembly 100 includes an inner annular dome 116 attached to the forward end 106 of the inner liner 102 and an outer annular dome 118 attached to the forward end 112 of the outer liner 108. Although the inner and outer annular domes 116, 118 are shown each including an enclosed surface defining a slot 122 for receipt of the forward ends 106, 112 of the respective inner and outer liners 102, 108, any suitable attachment scheme can be utilized to attach the liners to the respective domes. Also, although the exemplary combustor assembly 100 is shown including an inner and an outer annular dome, it is to be understood that in other embodiments, the dome may be formed as a single dome construction or any other suitable multi-dome construction (e.g., 3 domes, etc.).

The combustor assembly 100 further includes a plurality of fuel air mixers 124 spaced along a circumferential direction within the outer dome 118. More particularly, the plurality of fuel air mixers 124 are disposed between the outer dome 118 and the inner dome 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer domes 116, 118 are configured to assist in providing such a flow of compressed air from the compressor section into or through the fuel air mixers 126. For example, the outer dome 118 includes an outer cowl 126 at a forward end 128 and the inner dome 116 similarly includes an inner cowl 130 at a forward end 132. The outer cowl 126 and inner cowl 130 may assist in directing the flow of compressed air from the compressor section 22, 24 into or through one or more of the fuel air mixers.

Moreover, the inner and outer domes 116, 118 each include attachment portions configured to assist in mounting the combustor assembly 100 within the turbofan engine 10. For example, the outer dome 118 includes an attachment extension 134 configured to be mounted to an outer combustor casing (not shown) and the inner dome 116 includes a similar attachment extension 138 configured to attach to an annular support member (not shown) within the turbofan engine 10. In certain exemplary embodiments, the inner dome 116 may be formed integrally as a single annular component, and similarly, the outer dome 118 may also be formed integrally as a single annular component. It should be appreciated, however, that in other exemplary embodiments, the inner dome 116 and/or the outer dome 118 may alternatively be formed by one or more components joined in any suitable manner. For example, with reference to the outer dome 118, in certain exemplary embodiments, the outer cowl 126 may be formed separately from the outer dome 118 and attached to the forward end 128 of the outer dome 118 using, e.g., a welding process. Similarly, the attachment extension 134 may also be formed separately from the outer dome 118 and attached to the forward end 128 of the outer dome 118 using, e.g., a welding process. Additionally, or alternatively, the inner dome 116 may have a similar configuration.

Referring still to FIG. 2, the exemplary combustor assembly 100 further includes a plurality of heat shields 142 positioned around each fuel air mixer 124, arranged circumferentially. The heat shields 142, for the embodiment depicted, are attached to and extend between the outer dome 118 and the inner dome 116. The heat shields 142 are configured to protect certain components of the turbofan engine 10 from the relative extreme temperatures of the combustion chamber 114.

As will be appreciated, each of the heat shield 142 inner liner 102 and outer liner 108 are exposed to relatively harsh conditions of relatively high temperatures during operation of the gas turbine engine. As such, a thermal barrier coating 146 is present at least on the exposed surfaces of one or more of these components.

Particularly for the embodiment of FIG. 2, the heat shields 142 include a thermal barrier coating 146 for protecting the underlying structure of the heat shields 142. The thermal barrier coating 146 may be a ceramic coating, or any other suitable coating.

The thermal barrier coating 146 may generally include a ceramic thermal barrier material in one or more embodiments. For example, suitable ceramic thermal barrier coating materials may include various types of oxides, such as aluminum oxide ("alumina"), hafnium oxide ("hafnia"), or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandiastabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, the thermal barrier coating 146 may include yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example of yttria-stabilized zirconia thermal barrier coating includes about 7% yttria and about 93% zirconia. These types of zirconia may further include one or more of a second metal (e.g., a lanthanide, actinide, or the like) oxide, such as dysprosia, erbia, europia, gadolinia, neodymian, praseodymia, urania, and hafnia, to further reduce thermal conductivity of the thermal barrier coating material. In one or more embodiments, the thermal barrier coating material may further include an additional metal oxide, such as titania and/or alumina. For example, the thermal barrier coating 146 may be composed of 8YSZ, though higher yttria concentrations may be utilized.

Suitable ceramic thermal barrier coating materials may also include pyrochlores of general formula A2B2O7 where A is a metal having a valence of 3+ or 2+ (e.g., gadolinium, aluminum, cerium, lanthanum, or yttrium) and B is a metal having a valence of 4+ or 5+ (e.g., hafnium, titanium, cerium, or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate.

The thickness of the thermal barrier coating 146 may depend upon the substrate or the component it is deposited on. In some embodiments, the coating 146 has a thickness in a range of from about 25 micrometers (μm) to about 2000 μm. In some embodiments, the coating 146 has a thickness in a range of from about 25 μm to about 1500 μm. In some embodiments, the thickness is in a range of from about 25 μm to about 1000 μm.

Further, as will also be appreciated, through operation of the gas turbine engine 10 one or more portions of the thermal barrier coating 146 may wear down or degrade more quickly than other portions of the thermal barrier coating 146. For example, as is depicted schematically in FIG. 2, the thermal barrier coating 146 includes a worn portion 148 between adjacent fuel air mixers 124.

Figure 3:
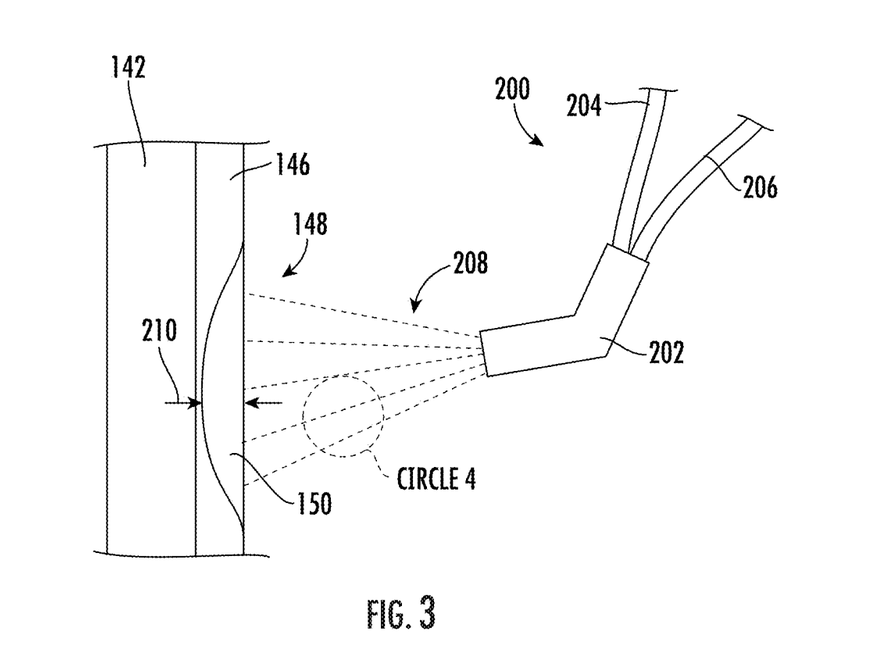
FIG. 3 is a schematic view of a system for repairing a portion of thermal barrier coating of a component in situ in accordance with an exemplary embodiment of the present disclosure.

Referring now to FIG. 3, a system 200 for repairing a worn portion 148 of a thermal barrier coating 146 is depicted schematically. The exemplary system 200 shown generally includes a nozzle 202 a mixture line 204 and a pressurized gas line 206. The mixture line 204 may provide a sprayable thermal barrier coating powder mixture 208 to the nozzle 202 and the pressurized gas line 206 may provide a flow of pressurized gas (such as a flow of pressurized air). The nozzle 202 may mix the flow of sprayable thermal barrier coating powder mixture 208 with the flow of pressurized gas to atomize the flow of sprayable thermal barrier coating powder mixture 208 and apply such thermal barrier coating powder mixture 208 to the worn portion 148 of the thermal barrier coating 146.

For the embodiment shown, the sprayable thermal barrier coating powder mixture 208 is configured to be applied directly to the worn portion 148 of the thermal barrier coating 146, an exposed portion of the underlying component, or both. More specifically, for the embodiment shown the sprayable thermal barrier coating powder mixture 208 is configured to be applied directly to the worn portion 148 of the thermal barrier coating 146, an exposed portion of the underlying component, or both without any intervening cleaning steps. In such a manner, the sprayable thermal barrier coating powder mixture 208 may be used to form a patch 150 to cover or fill in the worn portion 148 of the thermal barrier coating 146.

As such, it will be appreciated that this process may require minimal disassembly of the gas turbine engine components in order to undertake the coating restoration process, and that the coating may be applied to surfaces without requiring any special degreasing, cleaning or oxide removal that is typically required for many "in-shop" type repairs. Moreover, as will be appreciated from the description below, the coating chemistry and the spray process may be engineered to restore coating with oxidized surfaces. This may eliminate the need for any sort of flash bond coat process that may otherwise be undertaken for "in-shop" type repair applications.

Further, for the environment shown, the thermal barrier coating powder mixture 208, and system 200 for applying the same, is configured to form a coating having a thickness 210 greater than 2 mils (i.e., thousandths of an inch), such as greater than 4 mils, such as greater than 6 mils, such as greater than 10 mils, such as greater than 15 mils, such as up to about 45 mils, such as up to about 35 mils, such as up to about 25 mils. In such a manner, the thermal barrier coating powder mixture 208 may form a repaired portion of the thermal barrier coating 146. As used herein with reference to the repaired portion of the thermal barrier coating 146, the thickness 210 refers a maximum thickness of the repaired portion, or rather the maximum thickness of the patch 150.

Figure 4:
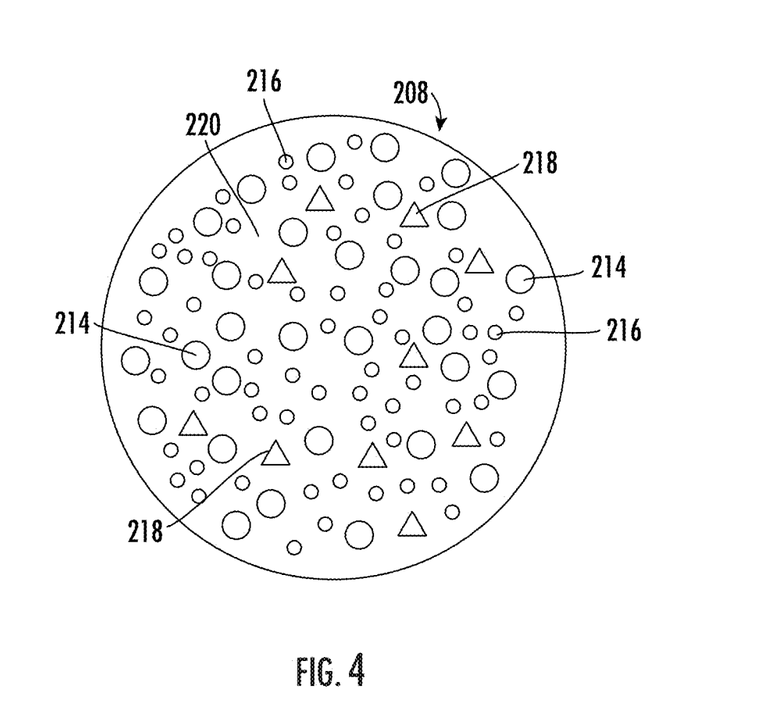
FIG. 4 is a close-up, schematic view of a sprayable thermal barrier coating powder mixture as may be used with the exemplary system of FIG. 3 in accordance with an exemplary embodiment of the present disclosure.

Referring now to FIG. 4, a close-up view of a sprayable thermal barrier coating powder mixture 208 is provided as may be utilized in the exemplary system 200 described above with reference to FIG. 3. It will be appreciated, however, that in other embodiments, the sprayable thermal barrier coating powder mixture 208 may instead be utilized with any other suitable system 200 capable of spraying the powder mixture 208 onto a component of a gas turbine engine (such as turbofan engine 10), or any other suitable gas turbine engine, in situ. For example, although the exemplary system 200 described above with reference to FIG. 3 is depicted applying the sprayable thermal barrier coating powder mixture 208 to the thermal barrier coating 146 of the heat shield 142 within the combustion section 26 of the gas turbine engine 10, in other exemplary embodiments, the sprayable thermal barrier coating powder mixture 208 depicted in FIG. 4, and described hereinbelow, may be applied to or otherwise utilized to repair a thermal barrier coating 146 on one or more combustion chamber liners, one or more turbine rotor blades, one or more turbine stator vanes, etc. Further, in other exemplary embodiments, the system 200 for applying such sprayable thermal barrier coating powder mixture 208 may include any other suitable technology for providing the sprayable thermal barrier coating powder mixture 208 to the worn portion 148 of the thermal barrier coating 146.

As is depicted in FIG. 4, the sprayable thermal barrier coating powder mixture 208 generally includes a dry composition having a low surface area ceramic powder 214 and a high surface area ceramic powder 216. As used herein, the term low surface area ceramic powder 214 refers to a ceramic powder having less than or equal to 10 meters squared of surface area per gram, such as less than or equal to 8 meters squared of surface area per gram, such as less than or equal to 5 meters squared of surface area per gram. Further, as used herein, the term high surface area ceramic powder 216 refers to a ceramic powder having greater than 10 meters squared of surface area per gram, such as greater than or equal to 15 meters squared of surface area per gram, and up to 400 meters squared of surface area per gram, such as up to 4000 meters squared of surface area per gram.

It will further be appreciated that as used herein, the term "ceramic powder" refers to a powder including one or more refractory oxides, such as one or more alumina, zirconia, hafnia, magnesia, silica, yttria, and combinations thereof.

In certain exemplary embodiments, the low surface area ceramic powder 214 and high surface area ceramic powder 216 may be formed of a material having substantially the same chemistry has a chemistry of a thermal barrier coating 146 to which is being applied. For example, when utilized with the exemplary system 200 of FIG. 3, the low surface area ceramic powder 214 and high surface area ceramic powder 216 of the sprayable thermal barrier coating powder mixture 208 utilized may have substantially the same chemistry as the thermal barrier coating 146 being repaired. For example, the powders 214, 216 and the thermal barrier coating 146 may each include at least 50% by weight of a common material or component.

Alternately, however, in other embodiments, the low surface area ceramic powder 214, the high surface area ceramic powder 216, or both may have different suitable chemistries.

In certain exemplary embodiments, the low surface area ceramic powder 214 may have a median particle size distribution greater than 5 microns and less than 50 microns, and the high surface area ceramic powder 216 may have a median particle size distribution smaller than 5 microns. For example, the low surface area ceramic powder 214 may have a median particle size distribution greater than 8 microns and less than 40 microns, and the high surface area ceramic powder 216 may have a median particle size distribution smaller than 4 microns, such as smaller than 3 microns, such as at least 0.1 microns.

It will be appreciated that the high surface area ceramic powder 216 may act as a binder to hold the powder mixture 208 together. Further, the low surface area ceramic powder 214 may act as a filler. When it is desired to apply a thicker thermal barrier coating 146, in general a larger low surface area ceramic powder 214 may be used, and by contrast, when it is desired to apply thinner thermal barrier coating 146, in general a smaller low surface area ceramic powder 214 may be used.

As will further be appreciated, in certain exemplary aspects, the sprayable thermal barrier coating powder mixture 208 may be configured to be sprayed on to the portion of the thermal barrier coating 146 and/or component to be repaired in situ and cured by exposure to operating temperatures within the gas turbine engine 10. In such a manner, the engine 10 may not need to be taken "off wing" and at least partially disassembled to allow the part being repaired to be put into a separate machine to cure a thermal barrier coating patch 150 applied thereto. In order to facilitate such a configuration, the sprayable thermal barrier coating powder mixture 208 may include one or more portions that function as binders holding the powder mixture 208 together across a relatively wide temperature range (referred to herein as the "activation temperature range" of the sprayable thermal barrier coating powder mixture 208, described in more detail below).

For example, in certain exemplary embodiments, the sprayable thermal barrier coating powder mixture 208 may further include at least one binder additive 218 (depicted schematically as a triangle in FIG. 4 solely to distinguish from the high and low surface area ceramic powders 216, 214). The at least one binder additive 218 may be an organic binder additive. For example, the organic binder additive may be one or more of: film forming polymeric binders such as polyvinyl alcohol, polyethylene oxide, poly ethylene glycol, polyvinylpyrrolidone (PVP), acrylates, acrylamides, and copolymers.

Inclusion of the organic binder additive may function as a binder for the sprayable thermal barrier coating powder mixture 208 at a temperature range less than 500 degrees Celsius, such as between 100 degrees Celsius and 500 degrees Celsius.

In further exemplary embodiments, the at least one binder additive 218 may additionally or alternatively be an inorganic binder additive. For example, the inorganic binder additive may be one or more high surface area (>10 m2/g) refractory oxides, such as one or more of alumina, zirconia, hafnia, silica, and yttria.

Inclusion of the inorganic binder additive may function as a binder for the sprayable thermal barrier coating powder mixture 208 at a temperature range greater than 500 degrees Celsius, such as between 500 degrees Celsius and 1000 degrees Celsius, such as up to 1200 degrees Celsius, such as up to 1500 degrees Celsius.

In such a manner, it will be appreciated that the sprayable thermal barrier coating powder mixture 208, such as a dry composition of the sprayable thermal barrier coating powder mixture 208 made up of the low surface area ceramic powder 214, the high surface area ceramic powder 216, and the binder additive(s) 218, if included, may together define an activation temperature range from at least 300 degrees Celsius to 1000 degrees Celsius, such as from 300 degrees Celsius to 1200 degrees, such as from Celsius 300 degrees Celsius to 1500 degrees Celsius.

In such a manner, it will be appreciated that as used herein, the term "activation temperature" for a particular component of the sprayable thermal barrier coating powder mixture 208 may refer to a temperature at which at least a portion of the particular component functions as a binder for other components of the sprayable thermal barrier coating powder mixture 208, and/or to the substrate to which the sprayable thermal barrier coating powder mixture 208 is applied. Specifically, the term activation temperature refers to a temperature at which the component enters the onset of the first stage of sintering. At this temperature (the activation temperature) there is inter-material diffusion that causes "neck formation" or chemical adhesion between particles, such as between ceramic particles. In at least certain exemplary embodiments, due to the high surface area nature of the inorganic binder utilized, chemical adhesion occurs at temperatures significantly below than a temperature of the engine when the engine is at takeoff speeds/power level.

As such, it will be appreciated, that as used herein the term "activation temperature range" refers to a temperature range across which at least a portion of at least one component of the sprayable thermal barrier coating powder mixture 208 functions as a binder for the sprayable thermal barrier coating powder mixture 208.

Moreover, it will be appreciated that the sprayable thermal barrier coating powder mixture 208 defines a cure temperature within or overlapping with the activation temperature range of the sprayable thermal barrier coating powder mixture 208. For example, the high surface area ceramic powder 216 of the sprayable thermal barrier coating powder mixture 208 may define a cure temperature at least partially greater than 1000 degrees Celsius and less than an upper bound of the activation temperature range of the sprayable thermal barrier coating powder mixture 208, such as less than 1500 degrees Celsius.

It will be appreciated that as used herein, the term "cure temperature" refers to a temperature above which the sprayable thermal barrier coating powder mixture 208 begins to undergo a process whereby the sprayable thermal barrier coating powder mixture 208 begins a material and/or chemical diffusion.

In such a manner, the sprayable thermal barrier coating powder mixture 208 may be applied to a portion of a thermal barrier coating 146 of a component an engine needing repair at a relatively low temperature, such as at a temperature between 0 degrees Celsius and 50 degrees Celsius. The sprayable thermal barrier coating powder mixture 208 may remain together in position on the worn portion 148 of the thermal barrier coating 146 through the temperatures of the engine 10 as the engine 10 starts up. Further, the sprayable thermal barrier coating powder mixture 208 may remain together in position on the worn portion 148 of the thermal barrier coating 146 until the engine 10 is operating at a temperature sufficient to cure the sprayable thermal barrier coating powder mixture 208 in position on the worn portion 148 of the thermal barrier coating 146 as a permanent patch 150 to the thermal barrier coating 146. In such a manner, the sprayable thermal barrier coating powder mixture 208 may be engine curable.

Referring still to the sprayable thermal barrier coating powder mixture 208 of FIG. 4, it will be appreciated that the binder additive 218 may not make up a large portion of the dry composition of the sprayable thermal barrier coating powder mixture 208 (the "dry composition" referring to all parts of the sprayable thermal barrier coating powder mixture 208 that are in a solid phase). For example, in the exemplary embodiment depicted, the low surface area ceramic powder 214 and high surface area ceramic powder 216 together makeup at least 80% by weight of the dry composition of the sprayable thermal barrier coating powder mixture 208. Notably, however, in other embodiments, the low surface area ceramic powder 214 and high surface area ceramic powder 216 may together makeup at least 90% by weight of the dry composition of the sprayable thermal barrier coating powder mixture 208, such as at least 95% by weight of the dry composition of the sprayable thermal barrier coating powder mixture 208. In such a manner, the resulting thermal barrier coating patch 150 may still be formed substantially of high temperature resistant ceramic materials.

Moreover, it will be appreciated that for at least certain exemplary embodiments, the low surface area ceramic powder 214 may make up at least 50% by weight of the dry composition of the sprayable thermal barrier coating powder mixture. For example, the low surface area ceramic powder 214 may make up at least 60% by weight of the dry composition, such as at least 70% by weight of the dry composition, such as up to 90% by weight of the dry composition.

Notably, referring back briefly to FIG. 3 and still also to FIG. 4, it will be appreciated that as noted throughout this application, the sprayable thermal barrier coating powder mixture 208 is "sprayable." In such a manner, it will be appreciated that the sprayable thermal barrier coating powder mixture 208 defines a flowability that facilitates it being sprayed with, e.g., a carrier gas, a high pressure gas source, etc. Specifically, for the embodiment of FIG. 3, the sprayable thermal barrier coating powder mixture 208 may be sprayed to a substrate, such as applied to the worn portion 148 of the thermal barrier coating 146, by atomizing the mixture with a high pressure gas. In order to facilitate this application method, and others, the sprayable thermal barrier coating powder mixture 208 further includes a liquid 220 added to the dry composition to form a slurry for spraying the mixture. The liquid may be configured to dry quickly during the application process. For example, the liquid may include a low boiling point liquid, such as a liquid alcohol, liquid ethanol, liquid carbon dioxide, etc. For example, the low boiling point liquid may define a boiling point less than 100 degrees Celsius, such as less than 50 degrees Celsius, such as less than 0 degrees Celsius, such as greater than absolute 0.

The liquid 220 added to the dry composition to form the sprayable thermal barrier coating powder mixture 208 (also referred to as a slurry) may be additionally or alternatively be a high vapor pressure fluid. For example, the liquid 220 may define a vapor pressure greater than or equal to 2.3 kPascals (kPa) at 20 degrees Celsius, such as greater than or equal to 4 kPa at 20 degrees Celsius, such as greater than or equal to 5.5 kPa at 20 degrees Celsius, such as up to 1,000 kPa at 20 degrees Celsius.

Inclusion of such a low boiling point liquid/high vapor pressure fluid may allow for the sprayable thermal barrier coating powder mixture 208 to flow to the nozzle 202 to be applied to the thermal barrier coating 146 or other component, such that the thermal barrier coating 146 or other component may be repaired in situ, but may evaporate relatively quickly to facilitate engine curing of the sprayable thermal barrier coating powder mixture 208.

In certain exemplary embodiments, the sprayable thermal barrier coating powder mixture 208 may define a solids loading between 30% and 80% (i.e., a percentage by weight of the dry composition portion of the sprayable thermal barrier coating powder mixture 208 to a wet composition portion of the sprayable thermal barrier coating powder mixture 208—which for the embodiment discussed is the drying agent).

Moreover, in certain exemplary embodiments, the sprayable thermal barrier coating powder mixture 208 may define a density between about 0.8 grams per cubic centimeter and 3 grams per cubic centimeter, such as between about 1 gram per cubic centimeter and 2.7 grams per cubic centimeter.

Inclusion of a slurry having such a solids loading and specific gravity may reduce a particle settling during a spraying process (including a pumping process), and further may reduce separation, agglomeration, reaction, polymerization etc. Moreover, such a configuration may ensure the slurry/mixture 208 is pumpable through relatively small tubes, such as through tubes having a diameter less than 0.1 inches, such as less than 0.075 inches, such as less than 0.06 inches (e.g., tube 204).

By way of example, only, in one exemplary embodiment, the sprayable thermal barrier coating powder mixture 208 may generally be formed in accordance with one or more of the following examples:

Example 1

A sprayable thermal barrier coating powder mixture 208 including:

Powder 1 with 21.6 grams 8YSZ ceramic oxide powder with <10m2/g specific surface area as the low surface area ceramic powder having a median size of approximately 8 microns;

Powder 2 with 5.4 grams 8YSZ ceramic oxide powder with >10m2/g specific surface area as the high surface area ceramic powder having a median size of approximately around 1 micron. This powder also acts as an inorganic binder 0.54 grams of polyvinylpyrrolidone organic binder 13.5 grams of denatured ethanol as the solvent with 13.5 grams of acetone as low boiling point liquid This formulation resulted in a good coating. The acetone acted as a drying agent and allowed the coating to dry when the slurry was "in-flight" resulting in a good quality coating.

Example 2

A sprayable thermal barrier coating powder mixture 208 including:

Powder 1 with 21.6 grams 8YSZ ceramic oxide powder with <10m2/g specific surface area as the low surface area ceramic powder having a median size of approximately 8 microns;

Powder 2 with 5.4 grams 8YSZ ceramic oxide powder with >10m2/g specific surface area as the high surface area ceramic powder having a median size of approximately around 1 micron. This powder also acts as an inorganic binder 0.54 grams of polyvinylpyrrolidone organic binder 13.5 grams of denatured ethanol as the solvent with 13.5 grams of petroleum ether as low boiling point liquid With each of these examples in order to evaluate the repair process and spray application process, the prepared slurry was used to repair laboratory coupons with engine simulated distress. The slurries were delivered through tubes to a gas atomized spray nozzle and sprayed using a process that mimics an on-wing configuration setup. The repaired samples were cured simulating engine operation and tested to determine coating durability.

With each of these examples in order to evaluate the repair efficacy, the coupons were tested in two different methods to simulate engine environment. The first method was a jet engine thermal shock (JETS) test. For this test, the repaired samples were tested to evaluate their ability to withstand multiple thermal shocks at engine idle and take off temperatures. The thermal shock testing simulates the thermal cycling that components experience in the turbine section of aircraft turbomachinery in general operation. The second method was a furnace cycle test (FCT). With this test, coupons were subjected to cyclic thermal exposure in a furnace. During a one hour cycle, the coupons were inserted rapidly into a bottom-loading furnace and held at 1135° C. for 45 minutes. The specimens were then withdrawn from the furnace and forced-air cooled for 15 minutes before beginning the next cycle. Specimens were removed from the FCT and examined after 20 cycles. The samples remained in the test until spallation of 20% of the coating area to determine the FCT life.

It will be appreciated that the exemplary sprayable thermal barrier coating powder mixture 208 described above is by way of example only. In other exemplary embodiments, the sprayable thermal barrier coating powder mixture 208 may have any other suitable configuration. For example, in other exemplary embodiments, the low surface area ceramic powder 214 may additionally or alternatively be a low surface area ceramic powder precursor. For example, the low surface area ceramic powder precursor may be a silicone, a titanium-based composition, or phosphate-based composition that thermally decomposes to form a refractory oxide to be used as the low surface area ceramic powder 214. Such may occur after the sprayable thermal barrier coating powder mixture 208 is applied to a substrate.

Figure 5:
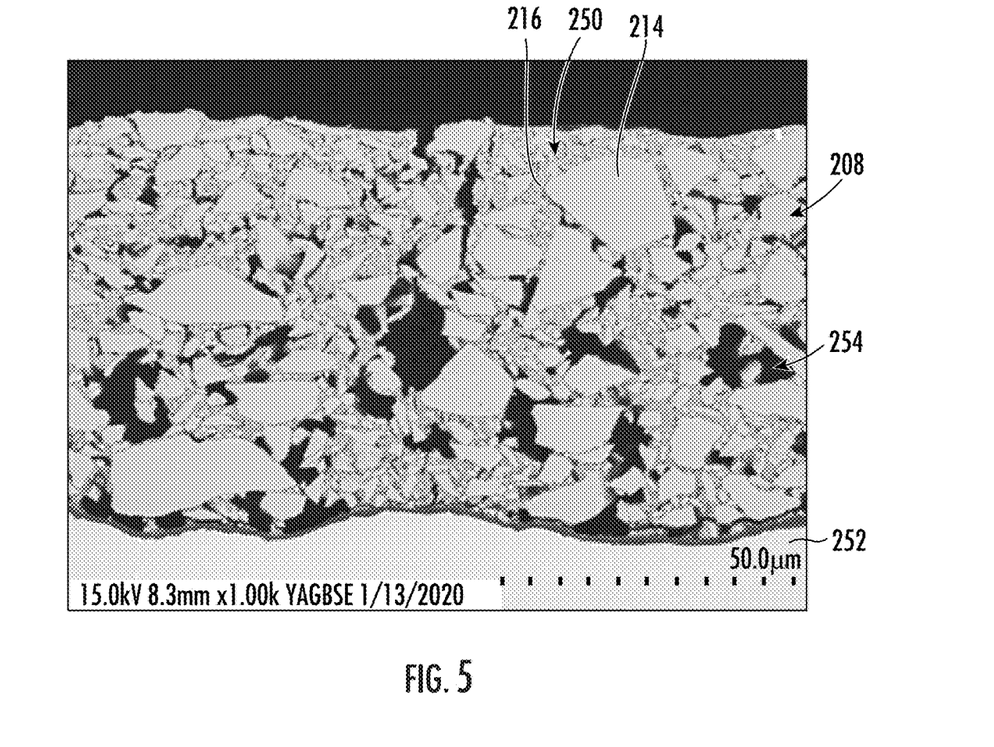
FIG. 5 shows a close-up, cross-sectional view of a repaired coating applied to the surface of an underlying component.
Figure 6:
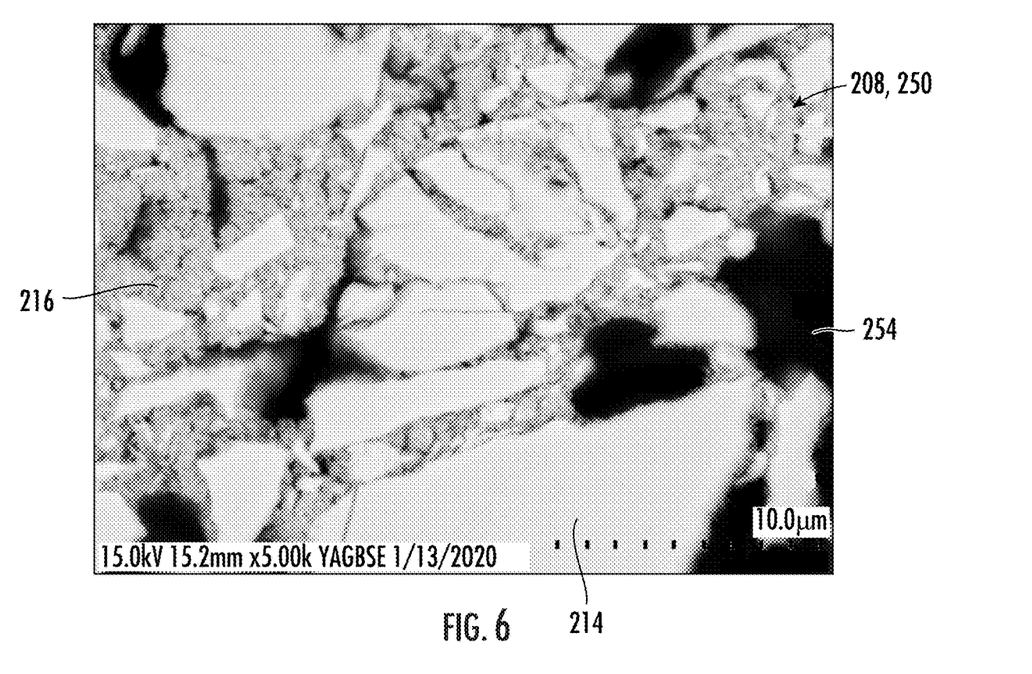
FIG. 6 shows a close of view of a portion of the repaired coating of FIG. 5.

A coating formed using a sprayable thermal barrier coating powder mixture 208 in accordance with one or more of these configurations may result in a coating having a relatively high thermal resistance/low thermal conductivity, that may attach directly to a component 252 surface without requiring any special degreasing, gleaning, or oxide removal. Referring now to FIGS. 5 and 6, close-up, cross-sectional views are provided of a repaired coating 250 applied to a surface of an underlying component 252. FIG. 5 shows a close-up, cross-sectional view of a repaired coating 250 applied to the surface of an underlying component 252, and FIG. 6 shows a close of view of a portion of the repaired coating 250 of FIG. 5.

As is shown, the repaired coating 250 is formed of a sprayable thermal barrier coating powder mixture 208 in accordance with one or more exemplary aspects of the present disclosure, such as one or more of the exemplary aspects described above. For example, the repaired coating 250 includes low surface area ceramic powder 214 and high surface area ceramic powder 216. As will also be appreciated, the repaired coating 250 defines a plurality of pores 254, such that it defines a porosity for improved thermal protection/a decreased thermal conductivity. For example, the exemplary coating 250 formed using the sprayable thermal barrier coating powder mixture 208 in accordance with one or more of the above configurations may result in a coating 250 having an engineered porosity that provides a desired amount of thermal protection with a relatively thin restored coating 250. For example, in at least certain exemplary embodiments, a thermal conductivity of the restored coating 250 shown in FIGS. 5 and 6 can be tailored and may be between 0.4 Watts/meters-Kelvin and 2 Watts/meters-Kelvin, each at 1000 degrees C.

For example, the thermal conductivity of the restored coating 250 shown in FIGS. 5 and 6 can be tailored by modifying the porosity and maximum pore size within the coating 250. As used herein, the term "maximum pore size" refers to a greatest cross-wise measurement of a particular pore 254. In certain exemplary embodiments, the maximum pore size resulting from the low surface area ceramic powder 214 may be less than or equal to 15 microns, and the maximum pore size resulting from the high surface area ceramic powder 216 may be less than or equal to 1 micron.

Due to its intrinsic lower thermal conductivity, the coating 250 requirements to completely insulate the underlying material may be less than the original coating 250. Thinner coating 250 may result in lower in-plane stresses and allows for engine curing of the coating 250.

Figure 7:
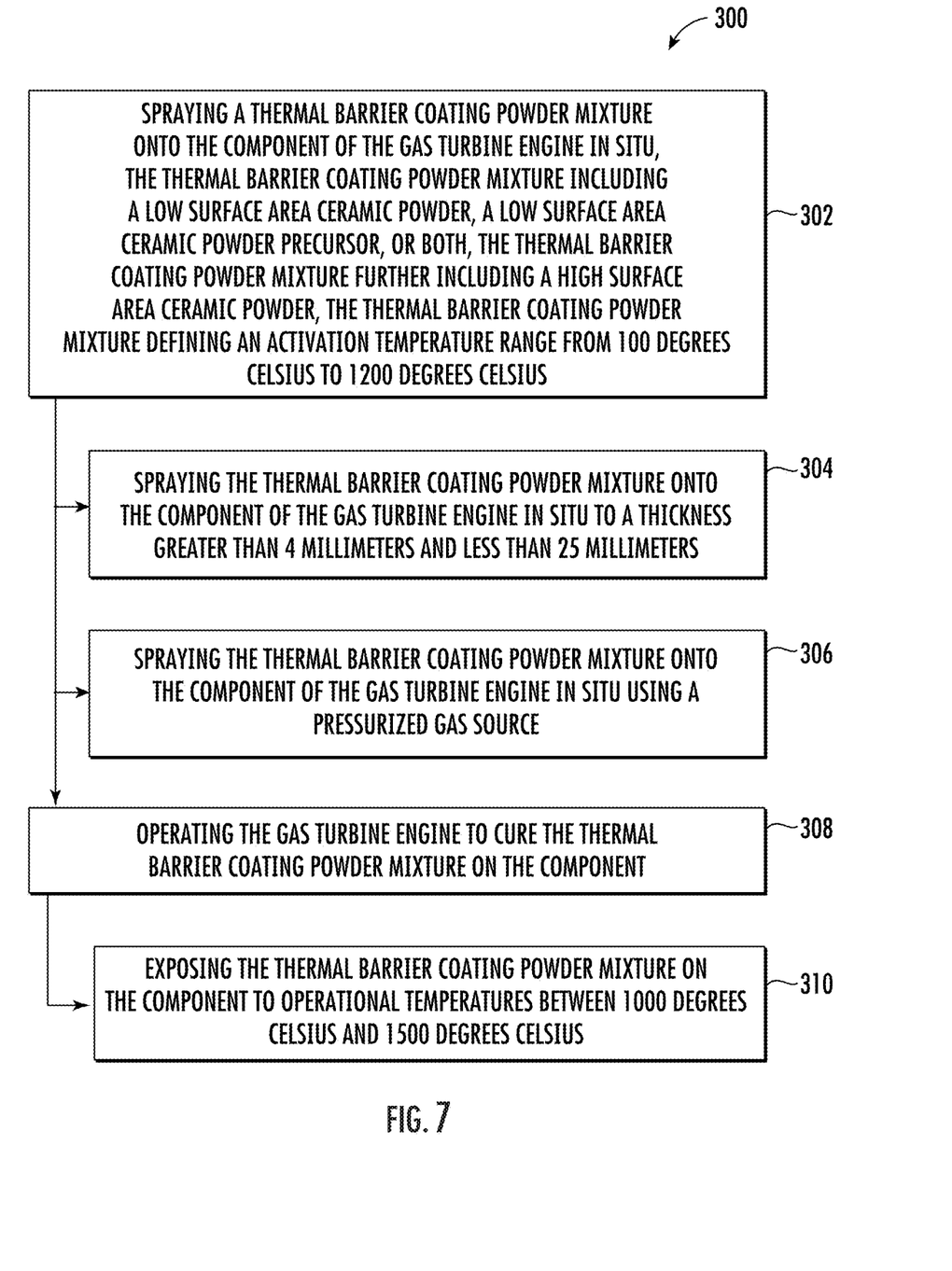
FIG. 7 is a flowchart of a method for repairing a thermal barrier coating of a component of a gas turbine engine in situ in accordance with an exemplary aspect of the present disclosure.

Referring now to FIG. 7, a method 300 for repairing a thermal barrier coating of a component of a gas turbine engine in situ is provided. The method 300 may utilize one or more of the exemplary aspects of a sprayable thermal barrier coating powder mixture described above. Further, the method 300 may be utilized on one or more of the exemplary components or engines described above, or alternatively may be utilized on any other suitable component, engine, or elsewhere.

The method 300 of FIG. 7 includes at (302) spraying a thermal barrier coating powder mixture onto the component of the gas turbine engine in situ, the thermal barrier coating powder mixture including a low surface area ceramic powder, a low surface area ceramic powder precursor, or both, the thermal barrier coating powder mixture further including a high surface area ceramic powder, the thermal barrier coating powder mixture defining an activation temperature range from 300 degrees Celsius to 1200 degrees Celsius. In such a manner, it will be appreciated that spraying the thermal barrier coating powder mixture onto the component of the gas turbine engine in situ at (302) may include spraying the thermal barrier coating powder mixture onto the component of the gas turbine engine with the component is installed within the gas turbine engine, while the gas turbine engine is substantially assembly (e.g., is at least 80% assembled), while the gas turbine engine is mounted to a vehicle (such as a wing or fuselage of an aircraft), or a combination thereof.

Further, for the exemplary aspect depicted, spraying the thermal barrier coating powder mixture onto the component of the gas turbine engine in situ at (302) includes at (304) spraying the thermal barrier coating powder mixture onto the component of the gas turbine engine in situ to a thickness greater than 2 mils (i.e., thousandths of an inch) and less than 25 mils.

Moreover, for the exemplary aspect depicted, spraying the thermal barrier coating powder mixture onto the component of the gas turbine engine in situ at (302) includes at (306) spraying the thermal barrier coating powder mixture onto the component of the gas turbine engine in situ using a pressurized gas source. In such a manner, spraying the thermal barrier coating powder mixture onto the component of the gas turbine engine in situ at (302) may include atomizing the thermal barrier coating powder mixture. In at least certain exemplary aspects, the pressurized gas may be any suitable carrier gas, such as an argon or air.

Further for the exemplary aspect of FIG. 7, the method 300 further includes at (308) operating the gas turbine engine to cure the thermal barrier coating powder mixture on the component. In such a manner, it will be appreciated that spraying the thermal barrier coating powder mixture onto the component of the gas turbine engine in situ at (302) may include spraying the thermal barrier coating powder mixture onto the component of the gas turbine engine in situ while the engine in not operating and is at a temperature below, e.g., 100 degrees Celsius, such as below 50 degrees Celsius. Further, operating the gas turbine engine to cure the thermal barrier coating powder mixture on the component at (308) may include operating the gas turbine engine to cure the thermal barrier coating powder mixture on the component after spraying the thermal barrier coating powder mixture onto the component of the gas turbine engine in situ at (302).

Referring still to FIG. 7, for the exemplary method 300 depicted, operating the gas turbine engine to cure the thermal barrier coating powder mixture on the component at (308) includes at (310) exposing the thermal barrier coating powder mixture on the component to operational temperatures between 1000 degrees Celsius and 1500 degrees Celsius.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A sprayable thermal barrier coating powder mixture for a gas turbine engine comprising: a dry composition comprising a low surface area ceramic powder having a median particle size distribution greater than 5 microns and less than 50 microns, and a high surface area ceramic powder having a median particle size distribution smaller than 5 microns, wherein the low surface area ceramic powder makes up at least 50% by weight of the dry composition of the sprayable thermal barrier coating powder mixture.

The mixture of one or more of these clauses, wherein the low surface area ceramic powder has less than 10 meters squared of surface area per gram, and wherein the high surface area ceramic powder has greater than 10 meters squared of surface area per gram and less than 4,000 meters squared of surface area per gram.

The mixture of one or more of these clauses, further comprising: a liquid added to the dry composition to form a slurry for spraying the mixture.

The mixture of one or more of these clauses, wherein the liquid comprises a low boiling point liquid.

The mixture of one or more of these clauses, wherein the mixture defines a solids loading between 30 percent by mass and 80 percent by mass.

The mixture of one or more of these clauses, wherein the mixture defines a specific gravity between about 0.8 grams per cubic centimeter and 3 grams per cubic centimeter.

The mixture of one or more of these clauses, wherein the mixture once cured defines a thermal conductivity between 0.4 Watts/meters-Kelvin and 2 Watts/meters-Kelvin, each at 1000 degrees C.

The mixture of one or more of these clauses, wherein the dry composition defines an activation temperature range from 300 degrees Celsius to 1200 degrees Celsius such that the thermal barrier coating powder mixture is configured to be sprayed on in situ and cured by exposure to operating temperatures within the gas turbine engine.

The mixture of one or more of these clauses, wherein the dry composition further comprises at least one binder additive, wherein the low surface area ceramic powder, the high surface area ceramic powder, and the at least one binder additive together define an activation temperature range from at least 300 degrees Celsius to 1200 degrees Celsius.

The mixture of one or more of these clauses, wherein the high surface area powder defines a curing temperature at least partially greater than 1000 degrees Celsius.

The mixture of one or more of these clauses, wherein the low surface area ceramic powder and high surface area ceramic powder together makeup at least 80% by weight of the dry composition of the sprayable thermal barrier coating powder mixture.

A method for repairing a thermal barrier coating of a component of a gas turbine engine in situ comprising: spraying a thermal barrier coating powder mixture onto the component of the gas turbine engine in situ, the thermal barrier coating powder mixture comprising a low surface area ceramic powder, a low surface area ceramic powder precursor, or both, the thermal barrier coating powder mixture further comprising a high surface area ceramic powder, the thermal barrier coating powder mixture defining an activation temperature range from 300 degrees Celsius to 1200 degrees Celsius; and operating the gas turbine engine to cure the thermal barrier coating powder mixture on the component.

The method of one or more of these clauses, wherein operating the gas turbine engine to cure the thermal barrier coating powder mixture on the component comprises exposing the thermal barrier coating powder mixture on the component to operational temperatures between 1000 degrees Celsius and 1500 degrees Celsius.

The method of one or more of these clauses, wherein spraying the thermal barrier coating powder mixture onto the component of the gas turbine engine in situ comprises spraying the thermal barrier coating powder mixture onto the component of the gas turbine engine in situ to a thickness greater than 2 mils and less than 25 mils.

The method of one or more of these clauses, wherein spraying the thermal barrier coating powder mixture onto the component of the gas turbine engine in situ comprises spraying the thermal barrier coating powder mixture onto the component of the gas turbine engine in situ using a pressurized gas source.

The method of one or more of these clauses, wherein spraying the thermal barrier coating powder mixture onto the component of the gas turbine engine in situ comprises spraying the thermal barrier coating powder mixture onto the component of the gas turbine engine in situ through one or more tubes having a diameter less than or equal to 0.06 inches.

The method of one or more of these clauses, wherein the thermal barrier coating powder mixture further comprises a drying agent to form a slurry, and wherein the drying agent comprises ethanol and a low boiling point liquid.

The method of one or more of these clauses, wherein the thermal barrier coating powder mixture comprises the low surface area ceramic powder, and wherein the low surface area ceramic powder and high surface area ceramic powder together makeup at least 80% by weight of a dry composition of the sprayable thermal barrier coating powder mixture.

A sprayable thermal barrier coating powder mixture for a gas turbine engine comprising: a dry composition comprising a low surface area ceramic powder, a low surface area ceramic powder precursor, or both and a high surface area ceramic powder, the dry composition defining an activation temperature range from at least 300 degrees Celsius to 1200 degrees Celsius such that the thermal barrier coating powder mixture is configured to be sprayed on in situ and cured by exposure to operating temperatures within the gas turbine engine.

The mixture of one or more of these clauses, wherein the low surface area ceramic powder, if included, has less than 5 meters squared of surface area per gram, wherein the low surface area ceramic powder precursor, if included, is configured to form a powder having less than 5 meters squared of surface area per gram, and wherein the high surface area ceramic powder has greater than 10 meters squared of surface area per gram and less than 4,000 meters squared of surface area per gram.

What is claimed is:

1. A sprayable thermal barrier coating powder mixture for a gas turbine engine comprising:
a dry composition comprising a low surface area ceramic powder having a median particle size greater than 5 microns and less than 50 microns, and a high surface area ceramic powder having a median particle size smaller than 5 microns, wherein the low surface area ceramic powder makes up at least 50% by weight of the dry composition of the sprayable thermal barrier coating powder mixture;
wherein the low surface area ceramic powder has less than 10 meters squared of surface area per gram, and wherein the high surface area ceramic powder has greater than 10 meters squared of surface area per gram and less than 4,000 meters squared of surface area per gram; and
at least one organic binder additive configured to function as a binder only at temperatures up to 500° C. or below;
wherein the low surface area ceramic powder and the high surface area ceramic powder each comprise zirconia.

2. The mixture of claim 1, further comprising:
a liquid added to the dry composition to form a slurry for spraying the mixture.

3. The mixture of claim 2, wherein the liquid comprises a low boiling point liquid.

4. The mixture of claim 2, wherein the mixture defines a solids loading between 30 percent by mass and 80 percent by mass.

5. The mixture of claim 2, wherein the mixture defines a density between about 0.8 grams per cubic centimeter and 3 grams per cubic centimeter.

6. The mixture of claim 2, wherein the mixture once cured defines a thermal conductivity between 0.4 Watts/meters-Kelvin and 2 Watts/meters-Kelvin, each at 1000 degrees C.

7. The mixture of claim 1, wherein the dry composition defines an activation temperature range from 300 degrees Celsius to 1200 degrees Celsius such that the thermal barrier coating powder mixture is configured to be sprayed on in situ and cured by exposure to operating temperatures within the gas turbine engine.

8. The mixture of claim 1, further comprising at least one additional binder additive, wherein the low surface area ceramic powder, the high surface area ceramic powder, the at least one organic binder additive and the at least one additional binder additive together define an activation temperature range from at least 300 degrees Celsius to 1200 degrees Celsius.

9. The mixture of claim 1, wherein the high surface area powder defines a curing temperature greater than 1000 degrees Celsius.

10. The mixture of claim 1, wherein the low surface area ceramic powder and high surface area ceramic powder together make up at least 80% by weight of the dry composition of the sprayable thermal barrier coating powder mixture.

11. A method for repairing a thermal barrier coating of a component of a gas turbine engine in situ comprising:
spraying a thermal barrier coating powder mixture onto the component of the gas turbine engine in situ, the thermal barrier coating powder mixture comprising a low surface area ceramic powder, a low surface area ceramic powder precursor, or both, the thermal barrier coating powder mixture further comprising a high surface area ceramic powder and at least one organic binder additive configured to function as a binder only at temperatures up to 500° C. or below, the thermal barrier coating powder mixture defining an activation temperature range from 300 degrees Celsius to 1200 degrees Celsius; and
operating the gas turbine engine to cure the thermal barrier coating powder mixture on the component.

12. The method of claim 11, wherein operating the gas turbine engine to cure the thermal barrier coating powder mixture on the component comprises exposing the thermal barrier coating powder mixture on the component to operational temperatures between 1000 degrees Celsius and 1500 degrees Celsius.

13. The method of claim 11, wherein spraying the thermal barrier coating powder mixture onto the component of the gas turbine engine in situ comprises spraying the thermal barrier coating powder mixture onto the component of the gas turbine engine in situ to a thickness greater than 2 mils and less than 25 mils.

14. The method of claim 11, wherein spraying the thermal barrier coating powder mixture onto the component of the gas turbine engine in situ comprises spraying the thermal barrier coating powder mixture onto the component of the gas turbine engine in situ using a pressurized gas source.

15. The method of claim 11, wherein spraying the thermal barrier coating powder mixture onto the component of the gas turbine engine in situ comprises spraying the thermal barrier coating powder mixture onto the component of the gas turbine engine in situ through one or more tubes having a diameter less than or equal to 0.06 inches.

16. The method of claim 11, wherein the thermal barrier coating powder mixture further comprises a drying agent to form a slurry, and wherein the drying agent comprises ethanol and a low boiling point liquid.

17. The method of claim 11, wherein the thermal barrier coating powder mixture comprises the low surface area ceramic powder, and wherein the low surface area ceramic powder and the high surface area ceramic powder together make up at least 80% by weight of a dry composition of the sprayable thermal barrier coating powder mixture.

18. A sprayable thermal barrier coating powder mixture for a gas turbine engine comprising:
a dry composition comprising a low surface area ceramic powder, a low surface area ceramic powder precursor, or both and a high surface area ceramic powder, the dry composition defining an activation temperature range from at least 300 degrees Celsius to 1200 degrees Celsius such that the thermal barrier coating powder mixture is configured to be sprayed on in situ and cured by exposure to operating temperatures within the gas turbine engine; and
at least one organic binder additive configured to function as a binder only at temperatures up to 500° C. or below;
wherein the low surface area ceramic powder and the high surface area ceramic powder each comprise zirconia.

19. The mixture of claim 18, wherein the low surface area ceramic powder, if included, has less than 5 meters squared of surface area per gram, wherein the low surface area ceramic powder precursor, if included, is configured to form a powder having less than 5 meters squared of surface area per gram, and wherein the high surface area ceramic powder has greater than 10 meters squared of surface area per gram and less than 4,000 meters squared of surface area per gram.

* * * * *